July 7, 1942.   W. W. CLARK   2,288,888
WELDING TORCH
Filed April 7, 1941   4 Sheets-Sheet 3

Inventor
WILMER W. CLARK
By Clarence A. O'Brien
Attorney

July 7, 1942.  W. W. CLARK  2,288,888
WELDING TORCH
Filed April 7, 1941  4 Sheets-Sheet 4
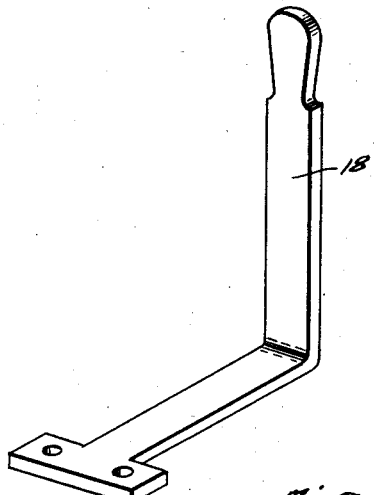
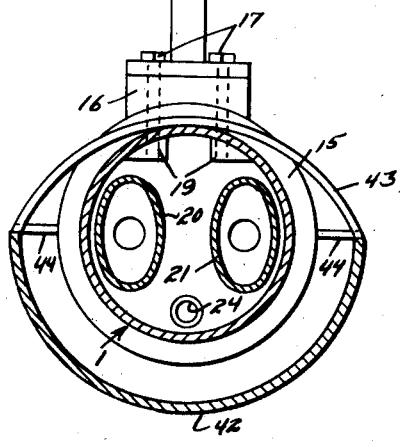
Inventor
WILMER W. CLARK
By Clarence A. O'Brien
Attorney Patented July 7, 1942

2,288,888

UNITED STATES PATENT OFFICE 2,288,888

WELDING TORCH

Wilmer W. Clark, Spokane, Wash.

Application April 7, 1941, Serial No. 387,328

5 Claims. (Cl. 113—59)

The present invention relates to new and useful improvements in welding torches and has for its primary object to provide, in a manner as hereinafter set forth, a device of this character comprising a series of spaced tips of a unique construction and arrangement whereby long welds on different kinds of work may be expeditiously and efficiently made.

Another very important object of the invention is to provide a welding torch of the aforementioned character comprising novel means for movably and adjustably supporting the tips over the seam.

Still another very important object of the invention is to provde a welding torch of the character described wherein each of the plurality of tips may be controlled and regulated as desired.

A still further important object of the invention is to provide a welding torch of the character set forth wherein the gas conduits or pipes and the tips will be water cooled.

Other objects of the invention are to provide a multiple tip welding torch which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 5 is a fragmentary view in vertical section through an intermediate portion of the torch, taken substantially on the line 5—5 of Figure 2.

Figure 6 is a view in horizontal section through an end portion of the device.

Figure 7 is a cross sectional view, taken substantially on the line 7—7 of Figure 1.

Figure 8 is a view in horizontal section, taken substantially on the line 8—8 of Figure 1.

Figure 9 is a detail view in perspective of one of the handles.

Figure 1:
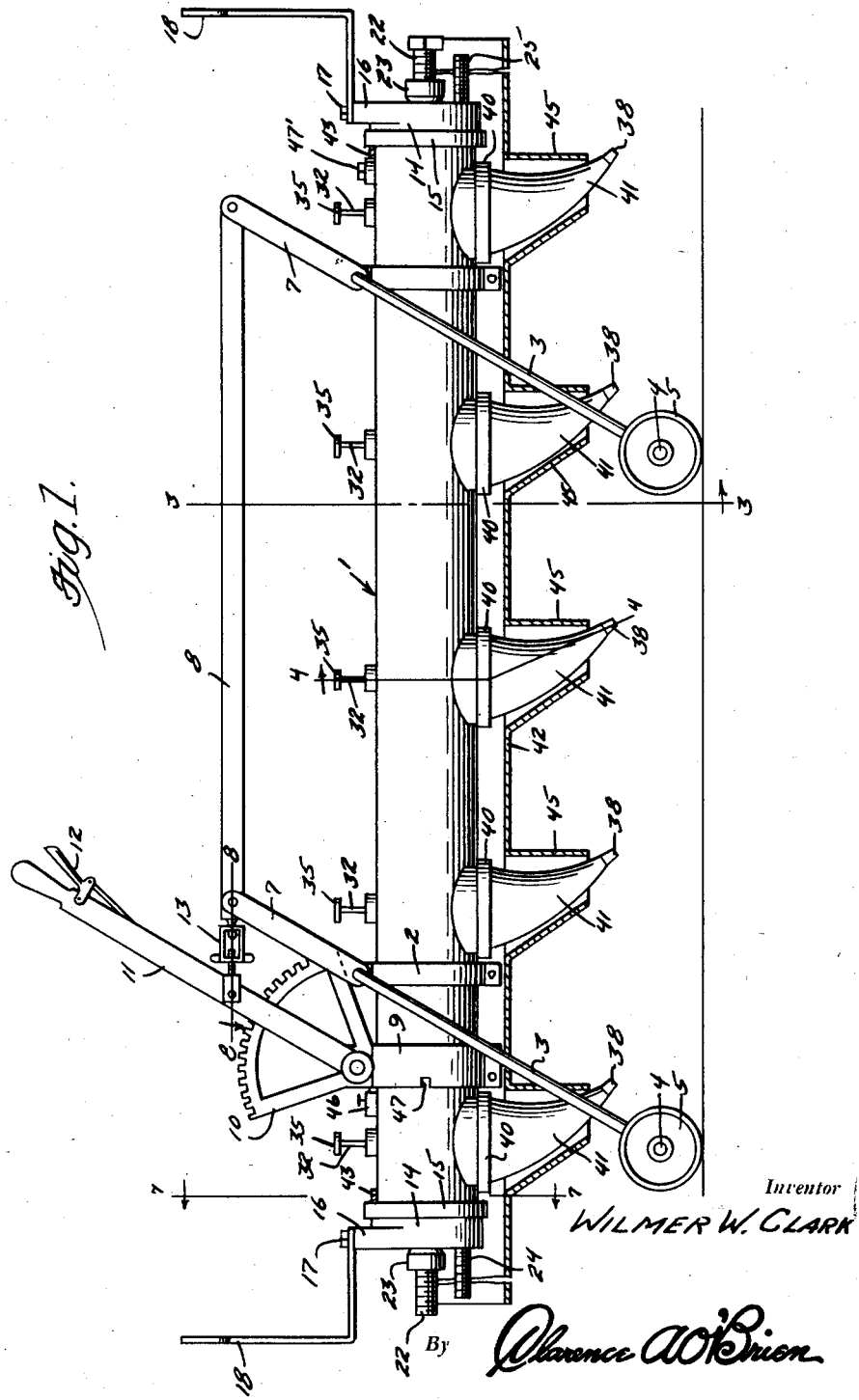
Figure 1 is a view in side elevation of a multiple tip welding torch constructed in accordance with the present invention, the heat shield being shown in longitudinal section.
Figure 2:
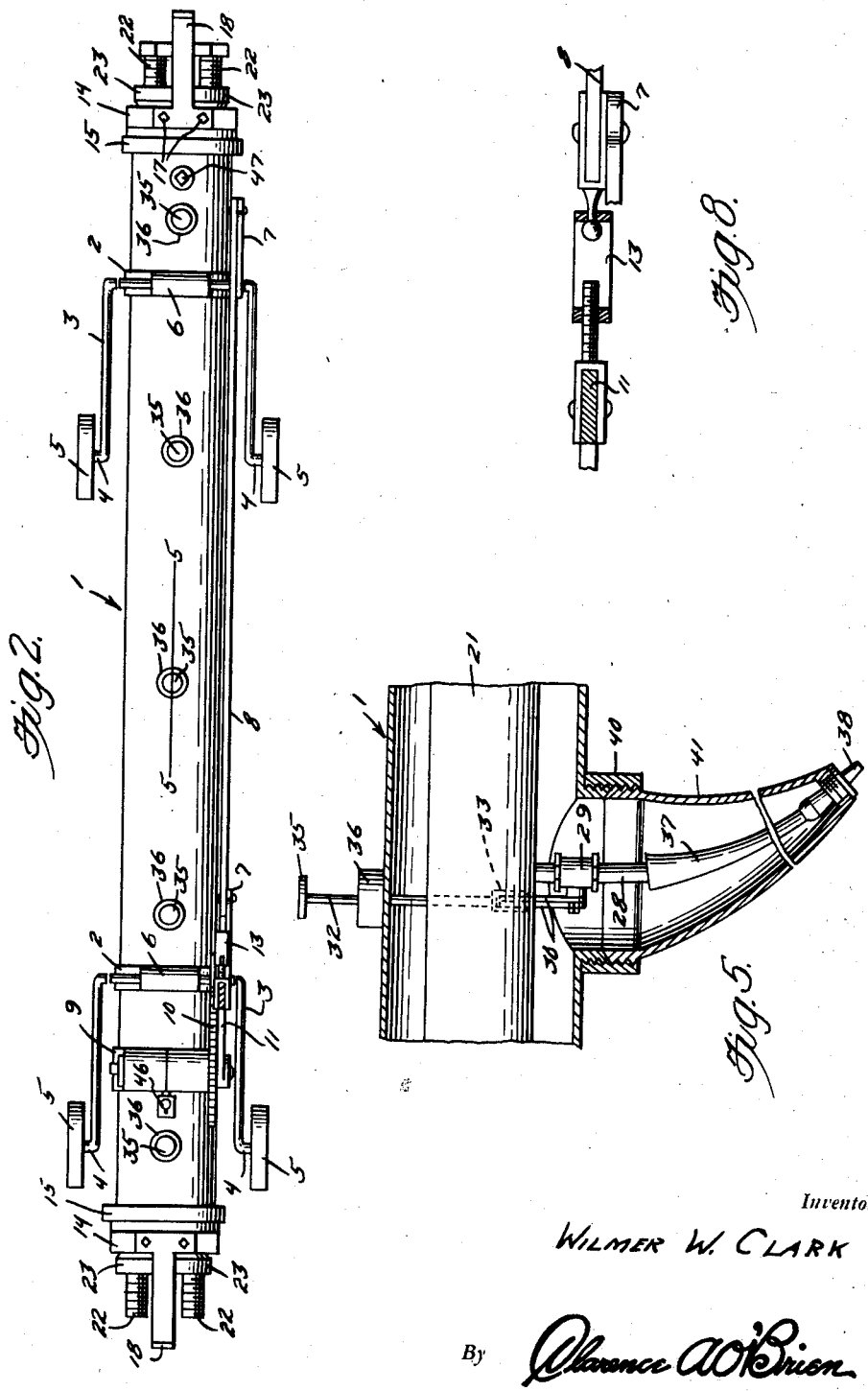
Figure 2 is a top plan view of the device, showing the hand lever in horizontal section.
Figures 3, 4:
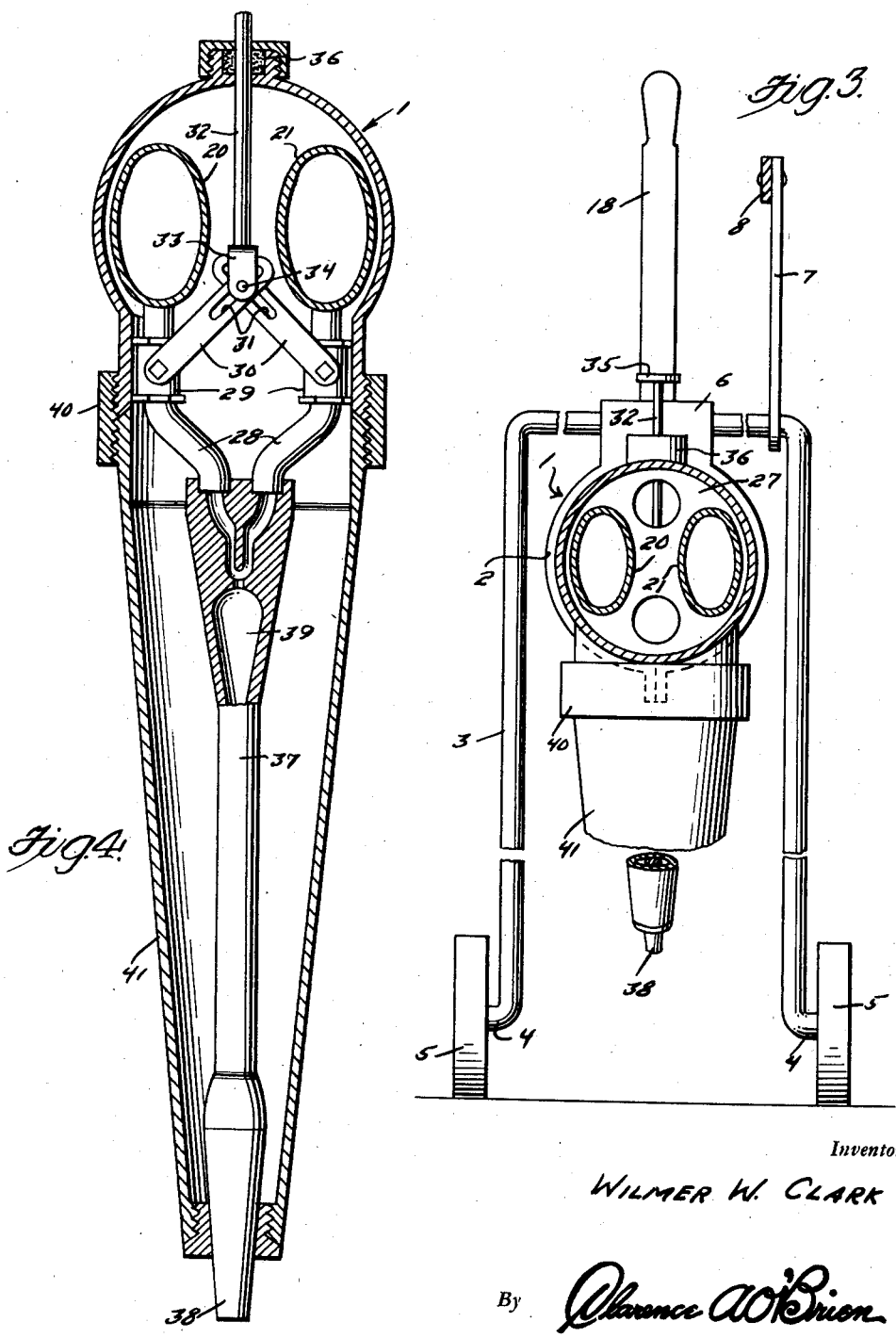
Figure 3 is a cross sectional view, taken substantially on the line 3—3 of Figure 1.
Figure 4 is a cross sectional view, taken substantially on the line 4—4 of Figure 1.

Referring now to the drawings in detail, it will be seen that the embodiment of the invention which has been illustrated comprises a horizontal tube which is designated generally by reference numeral 1, said tube being of any suitable length, diameter and material and constituting a water jacket. Journaled on the tubular jacket 1 at longitudinally spaced points are collars 2. Mounted for swinging movement on the collars 2 are substantially U-shaped supporting stands 3 which terminate in outturned end portions constituting spindles 4 on which wheels 5 are journaled. The bight or intermediate portions of the substantially U-shaped supporting stands 3 are journaled in bearings 6 which are provided therefor on the upper portions of the collars 2. Fixed on the bight portions of the stands 3 are arms 7. A rod or bar 8 connects the arms 7 for operation in unison. Journaled on the welder's end portion of the jacket 1 is a ring 9 which is substantially similar to the rings 2. Fixed on the upper portion of the ring 9 is a toothed segment 10. Mounted for swinging movement on the upper portion of the ring 9 is a hand lever 11 which is provided with a suitable latch 12 which is engageable with the segment 10 for releasably securing said lever in adjusted position. A turnbuckle device 13 adjustably connects one end of the bar or rod 8 to the hand lever 11 for actuation thereby. It will thus be seen that through the medium of the lever 11 the substantially U-shaped supporting stands 3 may be actuated in unison for raising and lowering the torch. The turnbuckle connection 13 facilitates the making of close or fine adjustments.

Removable caps 14 close the ends of the jacket 1. Suitable packings 15 provide leak proof joints between the caps 14 and the water jacket 1. The caps 14 are formed to provide upstanding lugs or projections 16. Secured by stud bolts 17 on the lugs 16 are angular levers 18. The end portions of the jacket 1 have formed therein sockets 19 (see Figure 7) in which the bolts 17 are engageable for positively securing the caps 14 on said jacket.

Extending longitudinally through the water jacket 1 and spaced therefrom are spaced, parallel oxygen and acetylene gas pipes 20 and 21, respectively. The gas pipes 20 and 21 are oval in cross section and terminate in circular, threaded end portions 22 (see Figure 6) which extend through the caps 14 and have threaded thereon retaining nuts 23. At the welder's end of the torch the pipes 20 and 21 are to be connected in any suitable manner to sources of oxygen and acetylene gas. The cap 14 on this end of the device is also provided with a water inlet connection 24. The cap on the other end of the device is provided with a water discharge connection 25. The end portions 22 of the pipes 20 and 21 on this end of the torch may also be connected with another torch, thus permitting a series of the devices to be connected together if desired. Apertured disks 27 support the pipes 20 and 21 at spaced points in the water jacket 1.

Depending from the pipes 20 and 21 at spaced points in the water jacket 1 are discharge pipes 28 having interposed therein control valves 29. The valves 29 include crossed operating arms 30 having formed therein slots 31. Extending slidably into the water jacket 1 through the upper portion thereof are stems or rods 32. The stems 32 are provided with yokes 33 on their lower ends having mounted therein pins 34 which are operable in the slots 31 of the arms 30 for opening and closing the pairs of valves 29 in unison. Operating heads or knobs 35 are provided on the upper ends of the stems 32. Suitable packings 36 on the water jacket 1 prevent leakage around the stems 32 and frictionally secure said stems in adjusted position.

The gas discharge pipes 28 are connected to the shanks 37 of downwardly and forwardly directed tips 38. The shanks 37 of the tips 38 have formed therein mixing chambers 39. Connected at 40 to the water jacket 1 are tapered branches 41 for cooling the tips 38.

Mounted beneath the water jacket 1 and spaced therefrom is a substantially trough shaped heat shield 42. It will be observed that the shield 42 extends beyond the ends of the torch. Suitable straps or bars 43 are provided on the trough 42 and extend across the water jacket 1 for suspending the guard or shield thereunder. Inwardly extending braces 44 on the shield 42 steady said shield on the water jacket 1. Tubes 45 depend from the shield 42 and accommodate the branches 41 of the cooling jacket 1.

It is thought that the manner in which the device functions will be readily apparent from a consideration of the foregoing. Briefly, the cooling jacket 1 is rotated in the collars 2 and 9 through the medium of the handles 18 in a manner to position the tips 38 for convenient lighting. A suitable latch 46 is provided on one end portion of the jacket 1 for releasably securing the device in position for lighting the tips. The latch 46 is engageable in notches 47 which are provided therefor in the ring 9. When the tips have been lit the jacket 1 is returned to its operating position with said tips over the seam. The tips are then adjusted toward or away from the work through the medium of the hand lever 11 swinging the substantially U-shaped supporting stands 3. As hereinbefore stated, the turnbuckle connection 13 facilitates the making of close adjustments. Through the medium of handles 18, the torch may now be moved back and forth over the work and the tips 38 may be swung laterally by rotating the jacket 1 in the rings 2 and 9. Cooling water from a suitable source of supply enters the jacket 1 at 24 and leaves at 25. One or more filling plugs 47' may be provided in the jacket 1 for filling said jacket with water when a pressure supply is not available. Through the medium of the stems 32 the valves 29 are opened and closed. Thus, any of the tips 38 may be put out of service when desired. This constitutes an important and highly desirable feature of the invention. By the use of the correct tips, the torch may also be utilized for cutting. Under some conditions suitable guides, conforming in shape to the work, may be placed on said work for keeping the torch centered over the seam. The invention also contemplates the use of electric means for igniting the tips 38.

It is believed that the many advantages of a multiple tip welding torch constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. In a welding apparatus of the character described embodying a plurality of tips and parallel gas pipes to which the tips are connected at longitudinally spaced points on the gas pipe; a water jacket enclosing the pipes, substantially U-shaped stands straddling said jacket, collars embracing said jacket and relative to which said jacket is rotatable, bearings on said collars and in which the bight portions of said U-shaped stands are journaled, and a manually manipulative operating connection between the bight portions of said stands for rotating the stands in unison for bodily positioning said water jacket and aforementioned associated parts at the desired position of adjustment relative to the work.

2. In a welding apparatus of the character described embodying a plurality of tips and parallel gas pipes to which the tips are connected at longitudinally spaced points on the gas pipe; a water jacket enclosing the pipes, substantially U-shaped stands straddling said jacket, collars embracing said jacket and relative to which said jacket is rotatable, bearings on said collars and in which the bight portions of said U-shaped stands are journaled, and a manually manipulative operating connection between the bight portions of said stands for rotating the stands in unison for bodily positioning said water jacket and aforementioned associated parts at the desired position of adjustment relative to the work, said manually manipulative means embodying a ring loosely embracing said jacket, a rack segment fixedly mounted on the last-named ring, a hand lever pivotally mounted on the last-named ring and equipped with a latch engageable with the segment for holding the lever at the desired position of adjustment, and an operating connection between said lever and the bight portions of said stands.

3. In a welding apparatus of the character described embodying a plurality of tips and parallel gas pipes to which the tips are connected at longitudinally spaced points on the gas pipe; a water jacket enclosing the pipes, substantially U-shaped stands straddling said jacket, collars embracing said jacket and relative to which said jacket is rotatable, bearings on said collars and in which the bight portions of said U-shaped stands are journaled, and a manually manipulative operating connection between the bight portions of said stands for rotating the stands in unison for bodily positioning said water jacket and aforementioned associated parts at the desired position of adjustment relative to the work, said manually manipulative means embodying a ring loosely embracing said jacket, a rack segment fixedly mounted on the last-named ring, a hand lever pivotally mounted on the last-named ring and equipped with a latch engageable with the segment for holding the lever at the desired position of adjustment, arms on the bight portions of said stands, a rod connecting said arms, and a turn-buckle device adjustably connecting one end of said rod to said hand lever.

4. In a welding apparatus of the character described embodying a plurality of tips and parallel gas pipes to which the tips are connected at longitudinally spaced points on the gas pipe; a water jacket enclosing the pipes, substantially U-shaped stands straddling said jacket, collars embracing said jacket and relative to which said jacket is rotatable, bearings on said collars and in which the bight portions of said U-shaped stands are journaled, and a manually manipulative operating connection between the bight portions of said stands for rotating the stands in unison for bodily positioning said water jacket and aforementioned associated parts at the desired position of adjustment relative to the work, said manually manipulative means embodying a ring loosely embracing said jacket, a rack segment fixedly mounted on the last-named ring, a hand lever pivotally mounted on the last-named ring and equipped with a latch engageable with the segment for holding the lever at the desired position of adjustment, arms on the bight portions of said stands, a rod connecting said arms, and a turn-buckle device adjustably connecting one end of said rod to said hand lever, each of said U-shaped stands having the legs thereof terminating in out-turned end portions constituting spindles, and wheels journaled on said spindles.

5. In a portable welding apparatus of the character described, and embodying a plurality of tips, and parallel gas pipes connected at intervals in the lengths thereof to said tips, an elongated tubular water jacket enclosing said pipes, substantially U-shaped wheel-equipped stands straddling said water jacket, rings disposed circumjacent said water jacket and provided with bearings in which intermediate portions of said stands are journaled, said rings serving to support said water jacket from the stands and for rotation within the confines of said rings relative to said stands, and manually manipulative means connected with said stands for operating them in unison in varying the angular position of said stands relative to the longitudinal axis of said water jacket for supporting said water jacket at the desired position of adjustment toward or away from the work.

WILMER W. CLARK.